March 22, 1932.   H. F. ZAHNER   1,850,193
WARMING TABLE
Filed Feb. 18, 1929    2 Sheets-Sheet 1
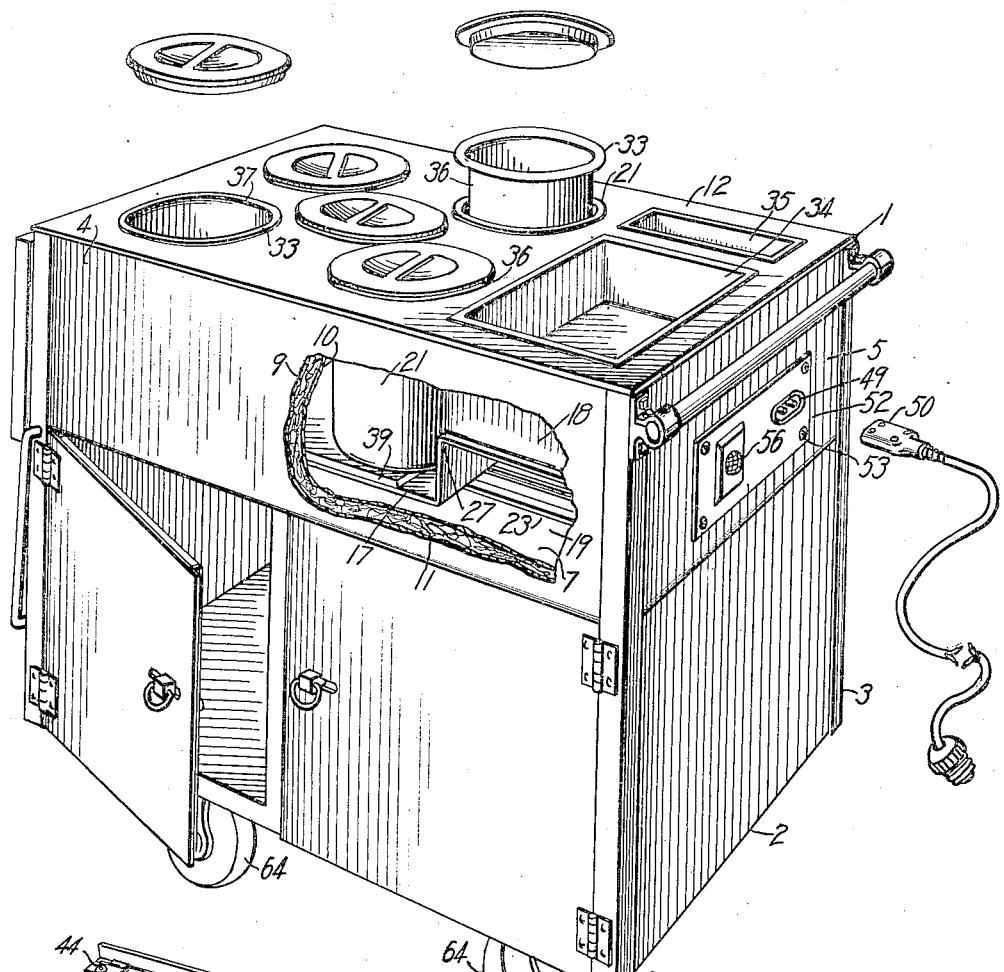

March 22, 1932.  H. F. ZAHNER  1,850,193
WARMING TABLE
Filed Feb. 18, 1929   2 Sheets-Sheet 2
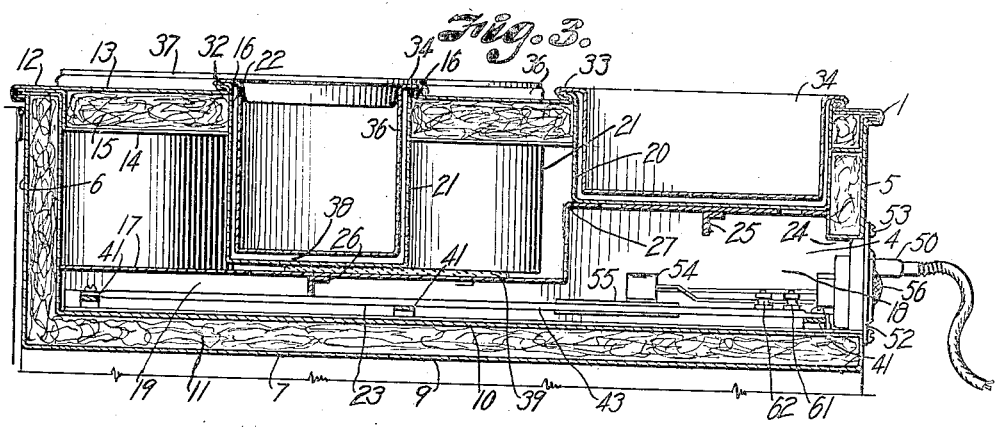
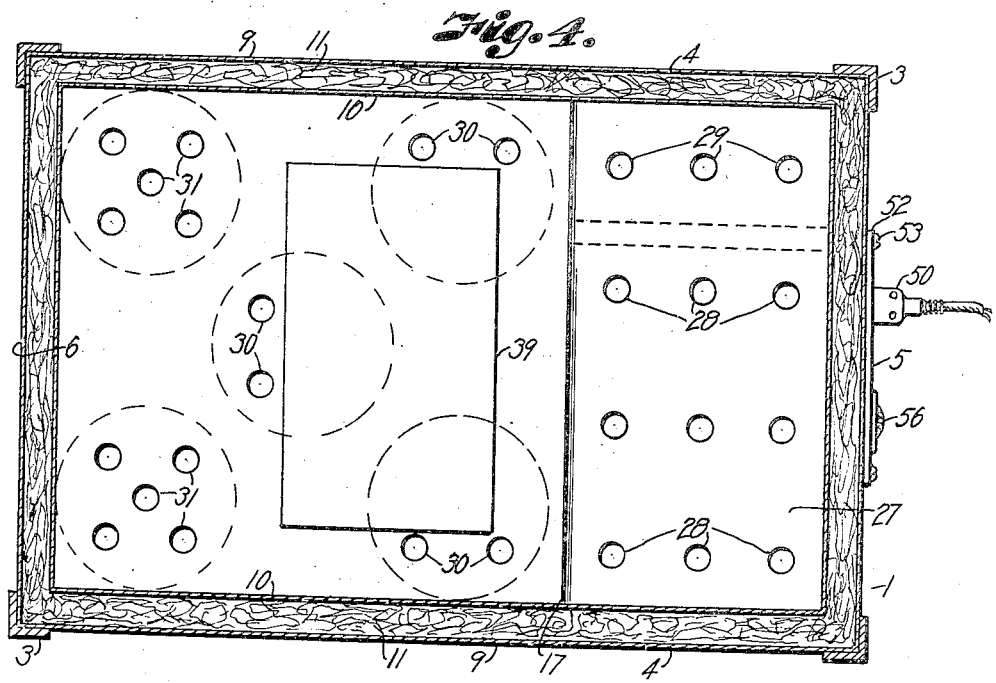
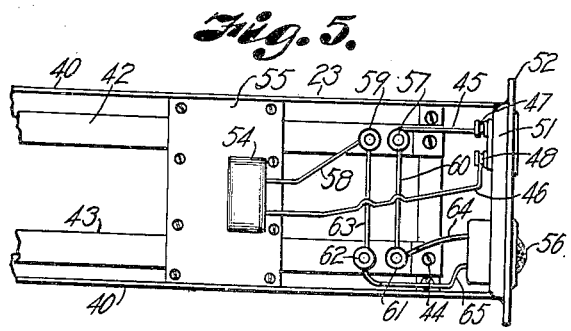
INVENTOR.
Henry F. Zahner.
BY
ATTORNEY Patented Mar. 22, 1932

1,850,193

UNITED STATES PATENT OFFICE

HENRY F. ZAHNER, OF KANSAS CITY, MISSOURI

WARMING TABLE

Application filed February 18, 1929. Serial No. 340,896.

My invention relates to heat-retaining food carriers and more particularly to warming tables for use in hospitals and restaurants for maintaining food in heated condition over relatively long periods, and provided with heating means, the principal objects of the invention being to facilitate and control the heating and reheating of heat retaining elements and food-containing vessels, to distribute heat suitably to the requirements of various types of food contained in the vessels, and to improve the ability of a device of this character to maintain the temperature of the food.

Ordinarily a device adapted to maintain the temperature of cooked food either is not provided with an activated source of heat or must be moved from the source of heat to the location from which the food is served. A further object of my invention therefore is to provide for heating and reheating the food storage unit of a portable device, of this character, to facilitate the application of a heating unit to the storage unit, and to provide electrically energized heating units which may be operated at any position where a light socket is available.

Since it is not desirable to heat the food to cooking temperature in heat retaining storage devices and close constant attention to the heat effects to prevent overheating or wasteful expediture of heat energy, a further object of my invention is to control the heating unit for limiting the extent of heat production, and to provide means for indicating the rise of temperature in the storage unit to the desired degree for retaining the heat of the cooked food.

In accomplishing these and other objects of the invention, I have provided improved details of structure, the preferred forms of which are illustrated in the accompanying drawings, wherein:

Fig. 1 is a perspective view of a cabinet constructed in accordance with my invention for warming food and retaining the heat of cooked food, a side wall being partly broken away to disclose interior structure, two pocket lids being shown separated, a food vessel partly removed from a pocket, and a conductor detached.

Fig. 2 is a detailed perspective view of a heating unit.

Fig. 3 is a longitudinal central vertical sectional view of the food storage and heater portion of the device.

Fig. 4 is a cross sectional view of the storage and heater portion including a plan view of a perforate plate between the heater compartment and the food storage compartment.

Fig. 5 is a fragmentary plan view of the heating unit.

Referring in detail to the drawings:

1 designates a box-like base open at the top, and 2 a warming table housing positioned on the base and secured thereto by angle corner pieces 3 attached to the aligned vertical edges of the table and base.

The housing comprises side walls 4, end walls 5 and 6, and a floor 7, all preferably similarly formed of outer and inner sheaths or sheets of metal 9 and 10, and insulating material 11 being installed between the sheets to confer heat-retaining character on the members. The outer sheets of the members are preferably formed integrally, and the inner sheets are similarly integral, to provide an open topped receiver having no seams at the lines of connection.

A top 12 is similarly formed of outer and inner sheets 13 and 14, with insulation 15 therebetween and adapted to fit into the upper end of the open-topped housing, the edges of the top sheets and wall sheets being inter-locked as by crimping to sealingly engage the top with the walls.

The top is provided with a plurality of openings 16, and a horizontal partition 17 divides the housing into upper and lower compartments 18 and 19 to form respectively a food storage section to receive pot-like liners or pockets such as 20, 21, and 22 suspended in the openings, and a heating section to receive a heating unit 23 adapted to be introduced through a door opening 24 in the end wall 5, all of which will be particularly described.

The partition 17 consists of a plate formed of heat-conducting material and is supported from the walls of the housing by angles 25 and 26 extending respectively transversely and longitudinally of the housing, the edge of the plate fitting snugly against the walls, and an upwardly offset portion 27 extending adjacent the door 24. The plate is provided with a plurality of groups of openings 28, 29, 30, and 31, differentiated as later described and respectively related to pockets and top openings, for the passage of heat from the heater to the pockets and to the upper compartment.

The pockets have upper edges sealingly interlocked as by crimping with the backturned edges of the outer sheet of the top at the openings to form seats 32 for the peripheral flanges 33 of food containing vessels 34, 35, 36 and 37 having substantially smaller diameter and depth than the pockets whereby chambers 38 are formed between the vessels and the pockets when the vessels are suspended in the housing.

The pockets may rest on the plate, to receive heat directly therefrom, as well as through the openings thereof, but I prefer to space selected pockets from the plate for limiting the amount of heat transmitted to the bottoms of the pockets and admitting the heat to contact with the sides of the depending pockets in the compartment.

The openings 28 and 29 are provided in the offset portion of the partition plate, the former being relatively numerous for admitting heat to the relatively large vessel 34 which is adapted to contain meat, while the latter openings are adapted for the gravy pan 35. The vessels 36, positioned over the middle portion of the plate and heating compartment, would receive an excessive amount of heat, and a relatively small number of openings 30 is provided in each group associated with a vessel-containing pocket 21, whereby the proportion of available heat which is permitted to influence the pockets through the openings is limited.

I further limit the heat influence on the pockets 21, and permit heated air to enter the compartment, by spacing said pockets from the plate, and still further limit the heat influence by inserting an insulating mat 39 between the plate and the pockets, and preferably seating the pockets on the mat. I arrange the openings 30 and position the pockets 21 so that portions of the pockets project laterally from the mat over the openings.

As the means for heating the compartments and the food, I preferably provide the heating unit 23 as an electrical unit, comprising spaced angle irons 40 connected by straps 41 to form a supporting frame, the ends of the straps being downwardly offset and attached to the horizontal flanges of the angle irons, and elongated heating elements 42 and 43 secured to the straps by bolts 44. The heating elements may be of ordinary type in which energizing wires extend, the energizing circuit including wires 45 and 46 connected with terminals 47 and 48 to which the socket 49 of a conductor 50 may be attached, and the terminals being supported in a head 51 fixed to the angle irons. A plate 52 on the head is adapted to overlie the outer face of the end wall adjacent the opening, and may be fixed thereto by bolts 53.

In order to prevent overheating of the compartments and food, and to provide for automatic control of heating, I interpose a thermostatic control or cutoff 54 in the circuit, and mount the same on a shelf 55 clamped to the heating elements adjacent the outer end thereof and adapted to support the cutoff beneath the upwardly offset portion of the plate, where adequate space is available and the cutoff may be relatively remote from the plate.

I further provide an indicating device to disclose the condition of the circuit, comprising an electric lamp 56 mounted in the head and connected in parallel with the cutoff in the circuit, whereby the lamp will glow when the circuit is closed, and breaking of the circuit by the cutoff due to increase of heat in the heating compartment to a predetermined degree will suspend energization of the lamp.

The circuit wire 45 is preferably connected to a post 57 which constitutes the outer terminal of the wire in the heating element 42 and represents the same, and a wire 58 leads from the opposite terminal post 59 of the heating element wire to the cutoff. A wire 60 connects the post 57 with the wire terminal post 61 of the heating element 43, the opposite wire terminal post 62 of said element being connected by a wire 63 with the post 59, and the circuit being completed by the wire 46 from the cutoff to the terminal in the head.

Wires 64 and 65 connected respectively with the posts 61 and 62 lead to the lamp for connecting the lamp in parallel in the circuit.

The device may be mounted on rollers 64 for convenient transportation.

In operating the device, food is cooked in the usual manner and vessels containing the cooked food are installed in the pockets of the cabinet. Current is supplied to the heating element and the air in the heating chamber, and the plate, are heated. Heat is transmitted through the openings and plate to the pockets and food-containing vessels. The air in the chambers between the vessels and the pockets is retained by the relatively sealing engagement of the flanges of the vessels with the edges of the pockets so that when the chambers and plate are heated to a degree approximately that of the vessels they will tend to preserve the desired temperature of the food in the vessels.

When the heat has risen to a predetermined degree, the cutoff will operate to break the circuit and suspend heat production. While the circuit is closed, the light will be glowing so that an operator may by a glance determine whether the temperature has been raised to the desired degree. When the light ceases to glow the operator may then at a suitable later time remove the cord in case the cabinet is wanted for portable use and move the same to another room. Should it be desired to warm the food a cord may be connected with a light socket and with the terminals of the heating unit to raise the temperature in the heating chamber and restore the food to the desired condition of warmth. Cords and light sockets may be available in widely separated locations so that the cabinet need not be returned to its original location in order to reheat the heating chamber and the food, and the operator may occupy himself with other business while the food is being reheated since the cutoff will automatically prevent the raising of the temperature to undesirable extent.

The thermostatic control may be of any desired construction and adapted for closing the circuit to reenergize the heating element when the temperature of the chamber and food decline below a predetermined degree.

Particular attention is called to the removable character of the heating section 23, which may be easily installed, and removed for repair or replacement of parts, and to which the heating unit, wires, and similar elements are connected. A substitute section may therefore be installed in a table, when the section originally installed therein must be removed for any reason.

What I claim and desire to secure by Letters Patent is:

1. In a cabinet of the character described, a horizontal heat conducting plate dividing the cabinet into a heating chamber and a food storage chamber and having a plurality of heat directing openings, and a plurality of pockets supported in the storage chamber to receive heat passing through and directed by said openings from the heating chamber on predetermined portions thereof and adapted to support food-containing vessels.

2. In a warming table of the character described, a housing, a conducting plate dividing the housing into a heating chamber and a food storage chamber and having a plurality of openings and an upwardly offset portion, a plurality of pockets seated on the plate to receive heat passing through said openings from the heating chamber and adapted to support food containing vessels, and an insulating sheet positioned on said plate below portions of selected pockets and obstructing the transfer of heat from the heating chamber to said portions.

3. In a device of the character described, a housing, a horizontal conducting plate dividing the housing into a lower heating chamber and an upper food storage chamber and having a plurality of groups of openings and an upwardly offset portion, a plurality of pockets suspended in the storage chamber to receive heat passing vertically through said openings from the heating chamber, food-containing vessels adapted for mounting in the pockets, means for supporting the vessels in spaced relation with the walls of the pockets, and a heating unit, the housing having an opening in a vertical wall adjacent said offset portion of the plate for admitting the heating unit to the heating chamber.

4. In combination with a warming table including a food storage compartment, a heating compartment, and a plurality of vessels suspended in the food storage compartment, a partition between the compartments having a plurality of openings differentially related to the several vessels for admitting different amounts of heat to the several vessels.

5. In a warming table of the character described, a housing, a top fixed to the housing having a plurality of openings, a plate in the housing parallel with said top and having a plurality of groups of apertures related respectively to said top openings, and pockets suspended from the top in the top openings, selected pockets contacting the plate and closing the apertures related to the top openings in which the selected pockets are suspended.

6. A warming table comprising a support, a housing including a food storage compartment and a heating compartment and having an opening in one wall, a heating unit adapted for introduction through the opening and for support from the floor of the housing in the heating compartment, a perforate plate supported from the walls of the housing between the compartments and having an upwardly offset portion forming an enlarged chamber portion of the heating compartment, and heat-responsive means supported by the heating unit in said chamber for controlling the heating unit.

7. In a warming table of the character described, a housing, a heat conducting plate having a plurality of heat directing openings therethrough for dividing the housing into a heating chamber and a food storage chamber, a plurality of pockets seated on the plate to receive heat on certain portions passing through said heat directing openings in the plate from the heating chamber, food receiving vessels received in the pockets, and means for supporting the vessels in spaced relation with the walls of the pockets to provide for distribution of heat over the walls of the vessels.

8. In a warming table of the character described, a housing, a horizontal heat conducting plate dividing the housing into a lower heating chamber and an upper food storage chamber, a plurality of pockets seated on the the plate to receive heat passing through said plate from the heating chamber, and food receiving vessels received in and spaced from the walls of the pockets and having flanges on their upper ends for seating on the walls of the pockets.

9. In a warming table of the character described, a housing, a conducting plate dividing the housing into a heating chamber and a food storage chamber and having a plurality of openings, a plurality of pockets seated on the plate to receive heat passing through said openings from the heating chamber and adapted to support food containing vessels, and an insulating sheet positioned on said plate below portions of selected pockets and obstructing the transfer of heat from the heating chamber to said portions.

10. In a warming table including a housing, a horizontal partition defining a heating chamber below the partition and a food storage chamber above the partition, and having a plurality of openings arranged to form a group, and a top on the housing having an opening registering with said group of openings in the partition, whereby heat is directed to a predetermined portion of a vessel located in the opening of said top.

11. In a warming table including a housing having a top provided with openings, a horizontal partition in the housing defining a heating chamber below the partition and a food storage chamber above the partition, and having a group of openings below each of said top openings, whereby predetermined portions of vessels located in said openings may be heated, and an insulating sheet movable over the partition to close selected openings therein.

12. A warming table including a housing having a horizontal partition defining storage and heating chambers and having a group of heat directing openings therethrough, a top on the housing having an opening, and a pocket member received in the opening having an upper open end secured to said top and a closed bottom, the bottom of said pocket being positioned directly over said group of openings, thereby receiving more heat from said heating chamber than the remainder of said pocket.

In testimony whereof I affix my signature.

HENRY F. ZAHNER.